United States Patent
Krehel et al.

(10) Patent No.: US 6,792,686 B2
(45) Date of Patent: Sep. 21, 2004

(54) LEVEL

(75) Inventors: Gregg C. Krehel, Newtown, CT (US); Bernie W. Baker, Herkiner, NY (US)

(73) Assignee: The Stanley Works, New Britain, CT (US)

( * ) Notice: Subject to any disclaimer, the term of this patent is extended or adjusted under 35 U.S.C. 154(b) by 0 days.

(21) Appl. No.: 10/753,456

(22) Filed: Jan. 9, 2004

(65) Prior Publication Data

US 2004/0143981 A1 Jul. 29, 2004

Related U.S. Application Data

(63) Continuation of application No. 09/604,792, filed on Jun. 28, 2000, now Pat. No. 6,675,490.

(51) Int. Cl.$^7$ .................................. G01C 9/24
(52) U.S. Cl. .............................. 33/382; 33/451; 33/365; 33/379
(58) Field of Search ........................ 33/347, 348, 365, 33/370, 371, 377, 379, 381, 382, 451

(56) References Cited

U.S. PATENT DOCUMENTS

| | | |
|---|---|---|
| 2,695,949 A | 11/1954 | Ashwill |
| 3,180,036 A | 4/1965 | Meeks, Sr. |
| 4,463,501 A | 8/1984 | Wright et al. |
| 4,979,310 A | 12/1990 | Wright |
| 5,033,199 A | 7/1991 | Wilcox et al. |
| 5,134,780 A | 8/1992 | Butler et al. |
| 5,406,714 A | 4/1995 | Baker et al. |
| 5,412,876 A | 5/1995 | Scheyer |
| 5,519,942 A | 5/1996 | Webb |
| 5,709,034 A | 1/1998 | Kohner |
| 5,940,978 A | 8/1999 | Wright et al. |
| 6,131,298 A | 10/2000 | McKinney et al. |
| 6,173,502 B1 | 1/2001 | Scarborough |

FOREIGN PATENT DOCUMENTS

| | | |
|---|---|---|
| GB | 357110 | 3/1930 |
| GB | 2080529 A | 7/1981 |
| WO | WO87/02314 | 4/1987 |

*Primary Examiner*—Christopher W. Fulton
*Assistant Examiner*—Travis Reis
(74) *Attorney, Agent, or Firm*—Pillsbury Winthrop LLP

(57) ABSTRACT

A level comprises an extruded thin wall frame structure having an opening of I-shaped configuration extending from end to end thereof. The thin wall frame structure includes a pair of elongated operative walls each having a pair of transversely spaced inwardly turned flanges defining the width thereof and an exterior operative surface extending between the flanges thereof. The operative surfaces are planar and parallel. A pair of angular walls extend from each pair of spaced flanges in converging relation with one another and a pair of central walls are spaced apart in the direction of the width of the operative walls a distance less than the width of the operative walls and integrally interconnected between the pairs of angular walls extending from the flanges. The operative walls and the central walls having a plurality of wall openings therein.

An end member closes the opening at each end of the thin wall frame structure. Each end member has structure constructed and arranged to cooperate with the configuration of the thin wall frame structure to fixedly secure each end member in closing relation with respect to the associated end of the thin wall frame structure. A level indicating vial system has structure constructed and arranged to cooperate with the configuration of the thin wall frame structure to fixedly secure the level indicating vial system therein.

8 Claims, 8 Drawing Sheets

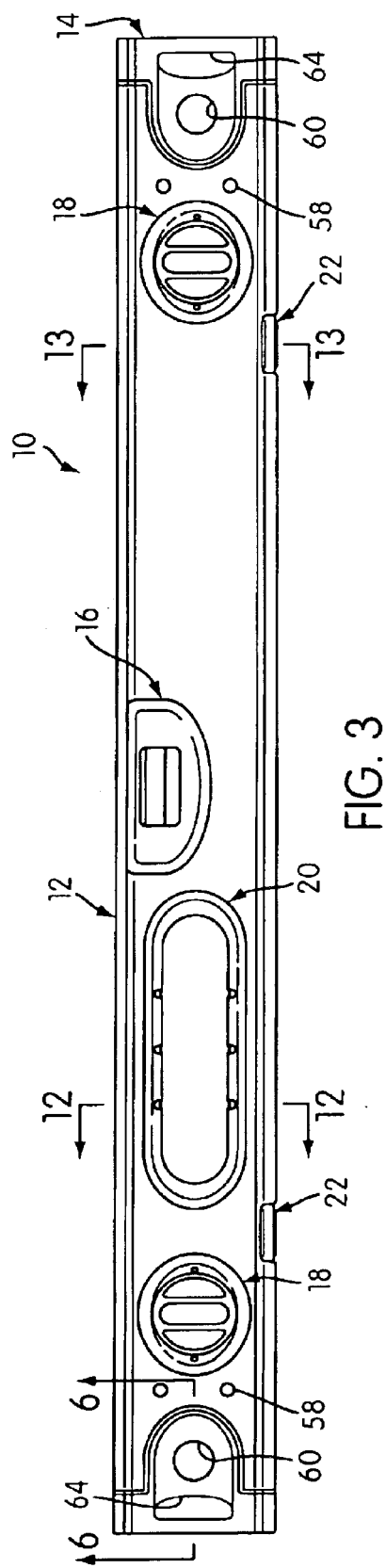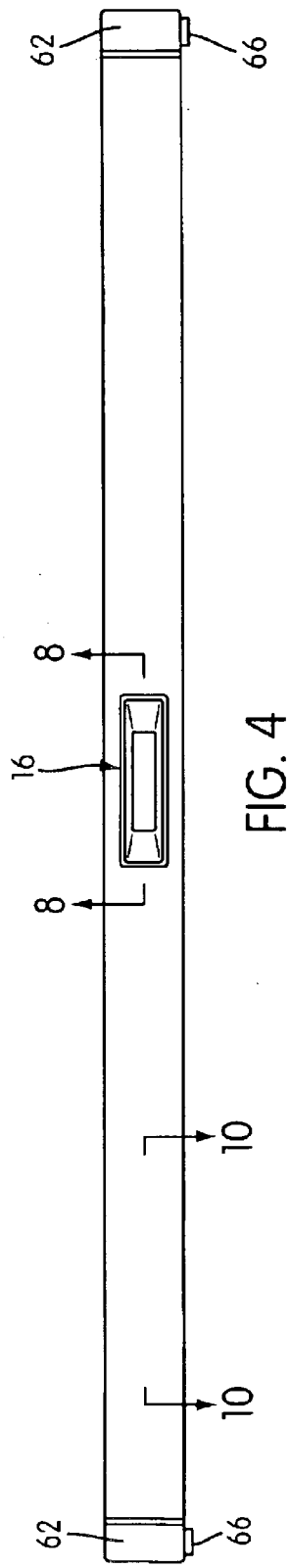
FIG. 3
FIG. 4

LEVEL

This application is a continuation of U.S. patent application Ser. No. 09/604,792, filed Jun. 28, 2000, now U.S. Pat. No. 6,675,490 the contents of which is hereby incorporated by reference herein in its entirety.

FIELD OF THE INVENTION

This invention relates generally to levels and more specifically to the construction of the frame structure of levels and the interface of the various level inserts therewith.

BACKGROUND OF THE INVENTION AND SUMMARY OF THE INVENTION

The type of level herein contemplated is the type of level having an extruded thin wall frame structure having inserts therein such as a level indicating vial assembly.

Levels of this type typically utilized an extruded thin wall frame structure in the form of a solid I-beam cross-sectional configuration. This configuration had the advantage of presenting the user with a convenient shape to handle the level anywhere along the entire length of the frame structure irrespective of the working or operative surface orientation.

Another extruded thin wall structure which enjoys practical usage is the so-called box frame structure which is essentially four integral walls in a rectangular cross-sectional configuration. The advantage of the box structure is that it resists twisting loads along the longitudinal axis better than frame structures of solid I beam cross-sectional configuration. This is particularly true when considering that the formation of openings in the frame structure to accommodate the various inserts had a much more deleterious effect on the twisting resistance with the solid I beam cross-section than is the case with the centrally hollow rectangular cross-sectional configuration where the openings do not remove material extending along the central longitudinal axis. However, with a hollow rectangular cross-sectional configuration, the handling advantages of the I beam configuration were lost, requiring handling to be accomplished with a much more difficult pinching action between the spaced sides as compared with a hooking action under the crosspiece at each end of the thin central wall.

A different extruded thin wall frame construction is disclosed in U.S. Pat. No. 5,134,780, which purports to get a better measure of the advantages of both the commercial prior art frame structures and lesser measure of the disadvantages of both. The patent refers to the construction as being of hollow I beam configuration. The patent discloses two different embodiments, which differ from one another solely in the configuration of the working or operative walls.

In both embodiments, the structure disclosed provides one operative wall, which is planar, and a second spaced operative wall, which is formed with a V groove. In both cases, a pair of central walls is provided between the operative walls and perpendicular flanges extend outwardly from opposite ends of the central walls. The perpendicular flanges at the ends of the central walls adjacent planar operative wall are simply integral with perpendicular flanges extending from the planar operative wall. In the first embodiment shown in FIG. 2, a pair of convexly arcuate walls connects the perpendicular flanges at the ends of the central walls adjacent the V groove operative wall to a centrally located V wall. In the second embodiment shown in FIG. 4, the operative wall is parallel to the planar operative wall and is formed with a central V groove therein. The V groove operative wall includes flanges that connect integrally with the adjacent perpendicularly flanges. The present invention is based upon the underlying concept that the specific shapes disclosed in the '780 patent could be improved to further enhance the accrued advantages and diminish the disadvantages which are achieved in comparison with the commercial prior art structures.

An object of the present invention is to achieve the aforesaid improvement. In accordance with the principles of the present invention, this objective is achieved by providing a level comprising an extruded thin wall frame structure having an opening of I-shaped configuration from end to end thereof. The thin wall frame structure includes a pair of elongated operative walls each having a pair of transversely spaced inwardly turned flanges defining the width thereof and an exterior operative surface extending between the flanges thereof. The operative surfaces are planar and parallel. A pair of angular walls extend from each pair of spaced flanges in converging relation with one another and a pair of central walls are spaced apart in the direction of the width of the operative walls a distance less than the width of the operative walls and integrally interconnected between the pairs of angular walls extending from the flanges. The operative walls and the central walls having a plurality of wall openings therein.

An end member closes the opening at each end of the thin wall frame structure. Each end member has structure constructed and arranged to cooperate with the configuration of the thin wall frame structure to fixedly secure each end member in closing relation with respect to the associated end of the thin wall frame structure. A level indicating vial system has structure constructed and arranged to cooperate with the configuration of the thin wall frame structure to fixedly secure the level indicating vial system therein.

From the above it can be seen that the four angular walls cooperate with the other components of the combination to provide enhanced resistance to twisting loads about the longitudinal axis of the thin wall frame structure. The angular walls act in a similar manner to diagonal braces.

In accordance with another aspect of the present invention, the preferred embodiment of the above mentioned level further includes the indicating vial system further including a horizontal level indicating vial assembly within a wall opening in one of the operative walls, and a pair of vertical level vial assemblies within aligned wall openings adjacent the end members.

In accordance with another aspect of the present invention, the preferred embodiment of the above mentioned level further includes a hand hold assembly within longitudinally elongated aligned wall openings in the central walls. The hand hold assembly has structure constructed and arranged to cooperate with the configuration of the thin wall frame structure to fixedly secure the hand hold assembly within the elongated aligned central wall openings so as to present a handheld opening through the central walls.

In accordance with another aspect of the present invention, the preferred embodiment of the above mentioned level further includes a magnet assembly mounted in an operative position with respect to the thin wall frame structure within each of a plurality of longitudinally spaced openings therein. The openings have a width greater than the distance between the central walls.

It is contemplated herein that the various inserts could be further improved to cooperate with the thin wall frame structure having I beam cross-sectional configuration of the above mentioned level. In accordance to another aspect of the present invention, the above mentioned thin wall frame structure has a central opening in one of the operative walls and adjacent coextensive generally aligned openings in the central walls. The above mentioned level indicating vial system includes a horizontal level indicating vial assembly. The horizontal level indicating vial assembly has structure constructed and arranged to cooperate with the thin wall frame structure to fixedly secure the horizontal indicating vial assembly with respect to the openings so that a horizontal level indication can be viewed alternatively through the central opening in the one operative wall or either of the aligned openings in the central walls. The central opening has a width less than the width of the one operative wall so that the remaining portions of the one operative wall coextensive with the central opening and the associated coextensive portions of the adjacent flanges and angular walls provide structural continuity for the thin wall frame structure in the area of the openings.

In accordance to another aspect of the present invention, the above mentioned horizontal level indicating assembly further includes a horizontal level indicating vial and a mounting assembly constructed and arranged to fixedly secure the horizontal level indicating vial in an operative position. The mounting assembly includes a vial viewing and carrying member having a shape sufficient to enable the same to be moved between the central walls. The vial viewing and carrying member includes a peripheral viewing wall portion configured and positioned to engage an interior marginal area of one of the operative walls defining the central opening, said peripheral viewing wall portion having an outermost exterior surface configured and positioned to be disposed within the central opening. The vial viewing and carrying member is fixed to the thin wall frame structure in an operative position between the central walls wherein the peripheral viewing wall portion is engaged with the interior marginal area and the exterior surface of the peripheral viewing wall portion is disposed within the central opening at a level inwardly of the operative surface of the one thin operative wall. The vial viewing and carrying member is constructed and arranged to carry the vial in a position to be viewed through the peripheral viewing wall portion.

In accordance to another aspect of the present invention, the above mentioned vertical level indicating assembly includes a leveling indicating vial constructed and arranged to be moved into an operative position between the central walls and a pair of cooperating peripheral members constructed and arranged to be moved axially toward one another within the aligned central wall openings into an operative position in fixed relation thereto. The cooperating peripheral members include outwardly extending portions defining oppositely facing surfaces positioned to engage outwardly facing exterior marginal surface areas surrounding the aligned central wall openings in the central walls when the cooperating peripheral members are moved axially into their operative positions. The cooperating peripheral members have radially inwardly extending portions defining surfaces facing toward one another to engage the vertical level indicating vial therebetween to position the level indicating vial when the peripheral members are moved into the operative position thereof.

In accordance to another aspect of the present invention, the above mentioned hand hold assembly includes longitudinally elongated cooperating peripheral members constructed and arranged to be moved axially toward one another within the aligned central wall openings into an operative position. The cooperating peripheral members have an outwardly extending portion at one end thereof defining oppositely facing surfaces positioned to engage an outwardly facing exterior marginal surface area surrounding the aligned central wall openings in the central walls when the cooperating peripheral members are moved axially into the operative positions. The cooperating peripheral members have cooperating securing elements thereon interengeagable when the peripheral members are moved into the operative position thereof to retain the peripheral members in fixed relation in the operative position. The cooperating peripheral members in the operative position have exterior surfaces defining a hand hold opening in the position of the aligned central wall openings.

In accordance to another aspect of the present invention, each above mentioned magnet assembly further includes each magnet assembly comprises a magnet structure defined by permanently magnetized material and a magnet holder movable into the opening into an operative position between the central walls wherein interengageable inwardly and outwardly facing surfaces on the magnet holder and the thin wall frame structure respectively are engaged to determine the operative position. A retaining element on the magnet holder is constructed and arranged to engage by a snap action with an interior wall surface to maintain the magnet holder into the operative position. The magnet holder is constructed and arranged to hold the magnet structure in an operative position within the opening when the magnet holder is in the operative position thereof.

It is contemplated that certain of the inserts may be improved regardless of the cross-sectional configuration of the thin wall frame structure. In accordance with another aspect of the present invention, a level comprises an extruded thin wall frame structure having an opening from end to end thereof. The thin wall frame structure includes a pair of operative walls each having edges defining the width thereof and a pair of central walls spaced apart in the direction of the width of the operative walls. An exterior operative surface extends between the edges thereof. The pair of central walls has a plurality of central wall openings therein. The thin wall frame structure has a level indicating vial assembly thereon. A plurality of insert structures in the thin wall frame structure includes an end member closing each end of the thin wall frame structure and a pair of peripheral members within longitudinally elongated aligned wall openings in the central walls. Each end member has structure constructed and arranged to cooperate with the configuration of the thin wall frame structure to fixedly secure each end member in closing relation with respect to the associated end of the thin wall frame structure. Each peripheral member has structure constructed and arranged to cooperate with the configuration of the thin wall frame structure to fixedly secure each peripheral member in closing relation with respect to the associated wall opening in the associated central wall of the thin wall frame structure. One of the insert structures has the structure thereof which cooperates with the thin wall frame structure formed of a relatively hard material and includes an outer layer of elastomeric material overlaying a relatively hard material. The layer of elastomeric material has an exterior surface defining a hand hold opening extending transversely with respect to the frame structure.

In accordance to the another aspect of the present invention, each above mentioned end member includes an end portion extending outwardly of the adjacent end of the thin wall frame structure having a peg receiving opening extending transversely therethrough which together with an outer layer of elastomeric material provide a shock absorption function for the associated end of the thin wall frame structure.

In accordance with another aspect of the present invention, one of the above mentioned end members has a projecting portion substantially filling the aligned recesses and the contiguous space therebetween. The projection portion has a hand hold opening extending transversely therethrough in the position of the aligned recesses in one end of the thin wall frame structure enabling the level to be stored in suspended relation from a peg therein.

Other objects, features, and advantages of the present invention will become apparent from the following detailed description, the accompanying drawings, and the appended claims.

BRIEF DESCRIPTION OF THE DRAWINGS

FIG. 3 is a side view of the level of FIG. 1;

FIG. 4 is a top plan view of the level of FIG. 1;

DETAILED DESCRIPTION OF THE INVENTION

Figure 1:
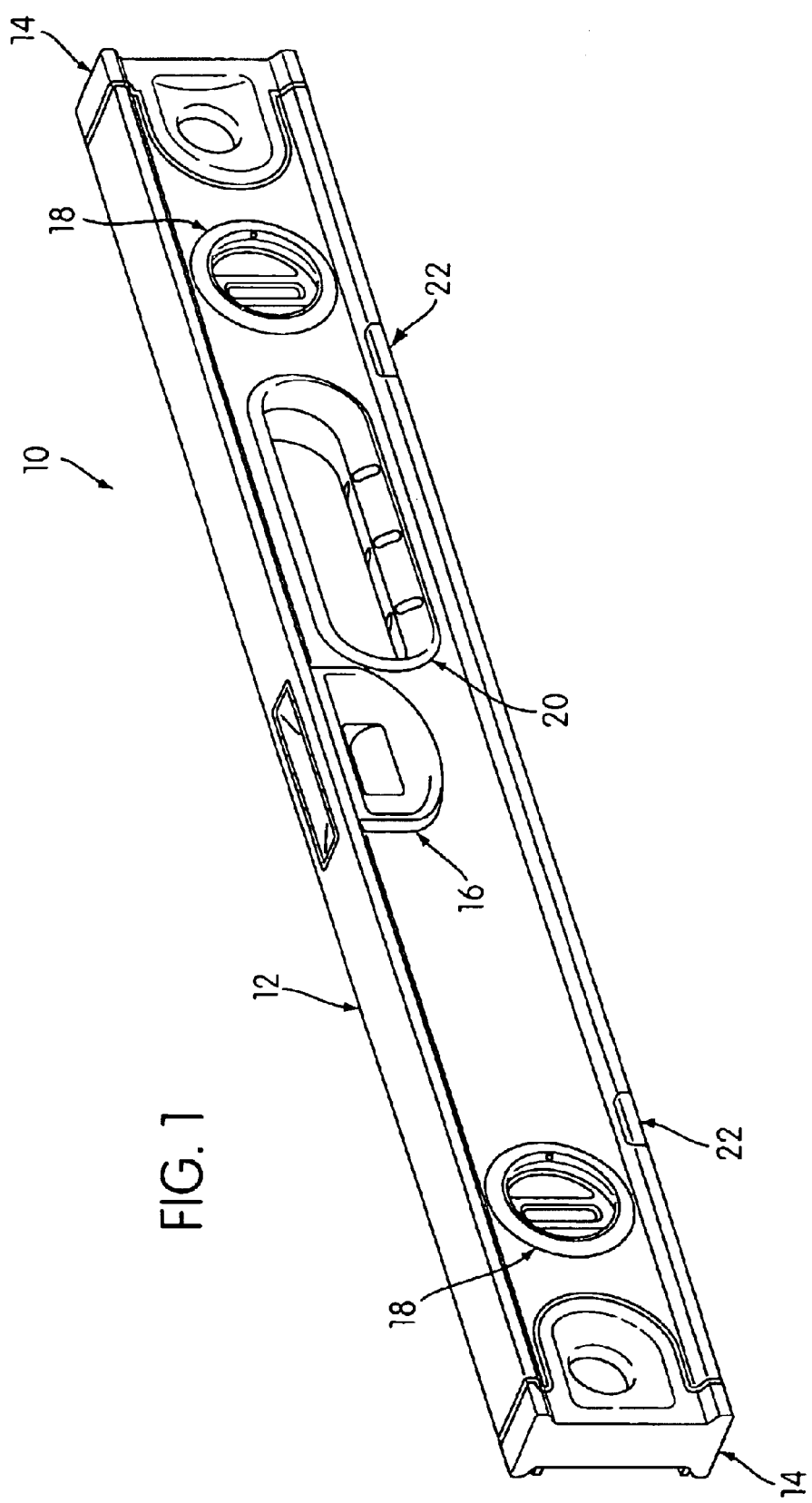
FIG. 1 is a perspective view of the preferred embodiment of the level embodying the principles of the present invention shown looking down on one end thereof and one side thereof.

Referring now more particularly to the drawings, FIG. 1 shows a preferred embodiment of a level, generally indicated at 10, embodying the principles of the present invention. The level 10 comprises an extruded thin wall structure, generally indicated at 12, having an opening of I-shaped configuration from end to end thereof. A pair of end members, generally indicated at 14, is mounted in the open ends of the frame structure 12. Each end member 14 is constructed and arranged to cooperate with the configuration of the thin wall frame structure 12 so as to be fixedly secured in closing relation with respect to the associated end of the thin wall frame structure 12. The level 10 further comprises a horizontal level indicating vial assembly, generally indicated at 16, a pair of vertical level indicating vial assemblies, generally indicated at 18, a hand hold assembly, generally indicated at 20, and a pair of magnet assemblies, generally indicated at 22. The horizontal level indicating vial assembly 16, the pair of vertical level indicating vial assemblies 18, the hand hold assembly 20, and the pair of magnet assemblies 22 are constructed and arranged to cooperate with the configuration of the thin wall frame structure 12 so as to be fixedly secured within the thin wall frame structure 12.

The horizontal level indicating vial assembly 16 and the vertical level indicating vial assembly 18 together constitute a level indicating vial system. It is within the contemplation of this invention that the system, which provides for both horizontal and vertical level indication could be a single assembly, rather than two as shown in the preferred embodiment.

Figure 2:
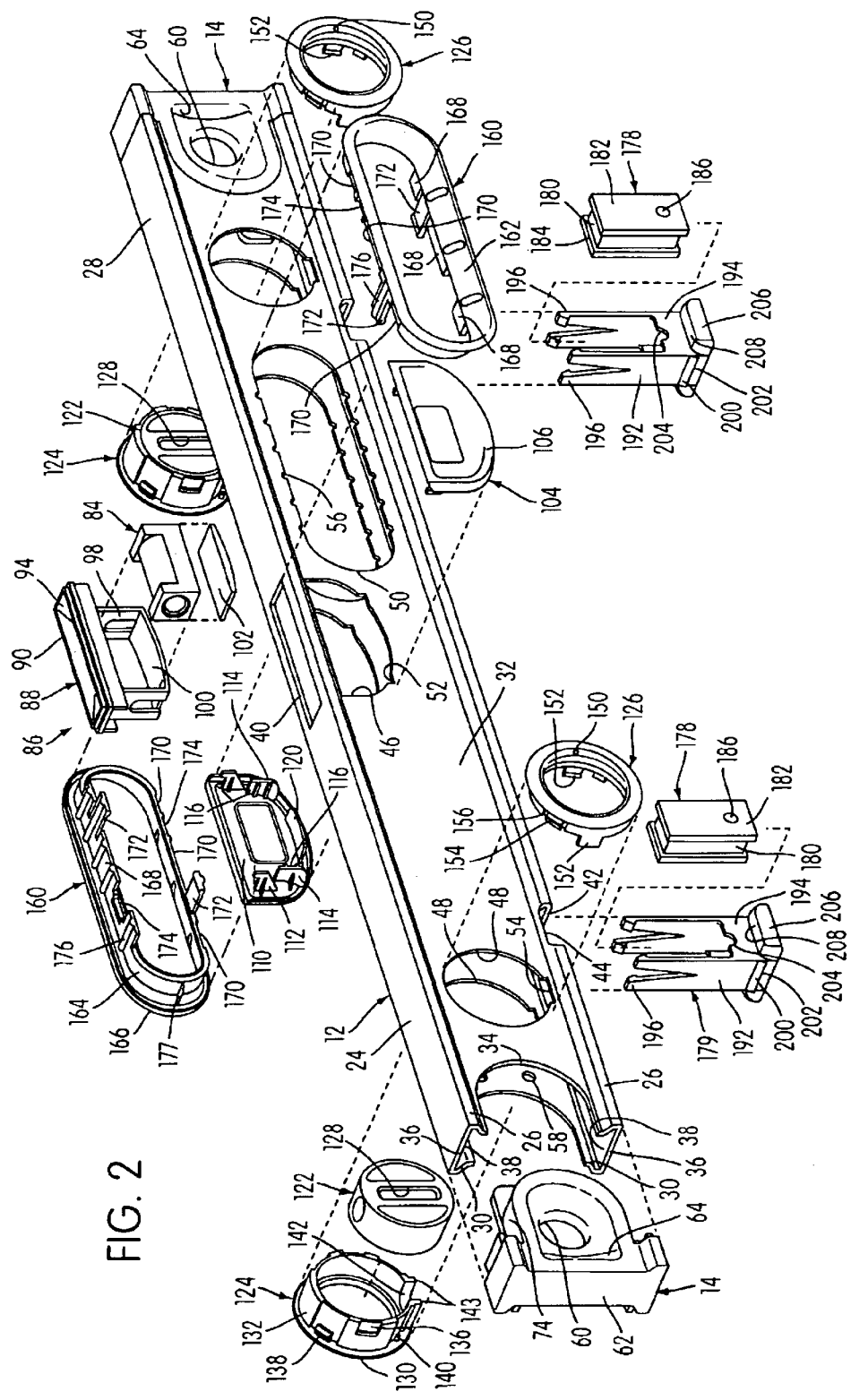
FIG. 2 is an exploded perspective view of the level of FIG. 1.
Figure 5:
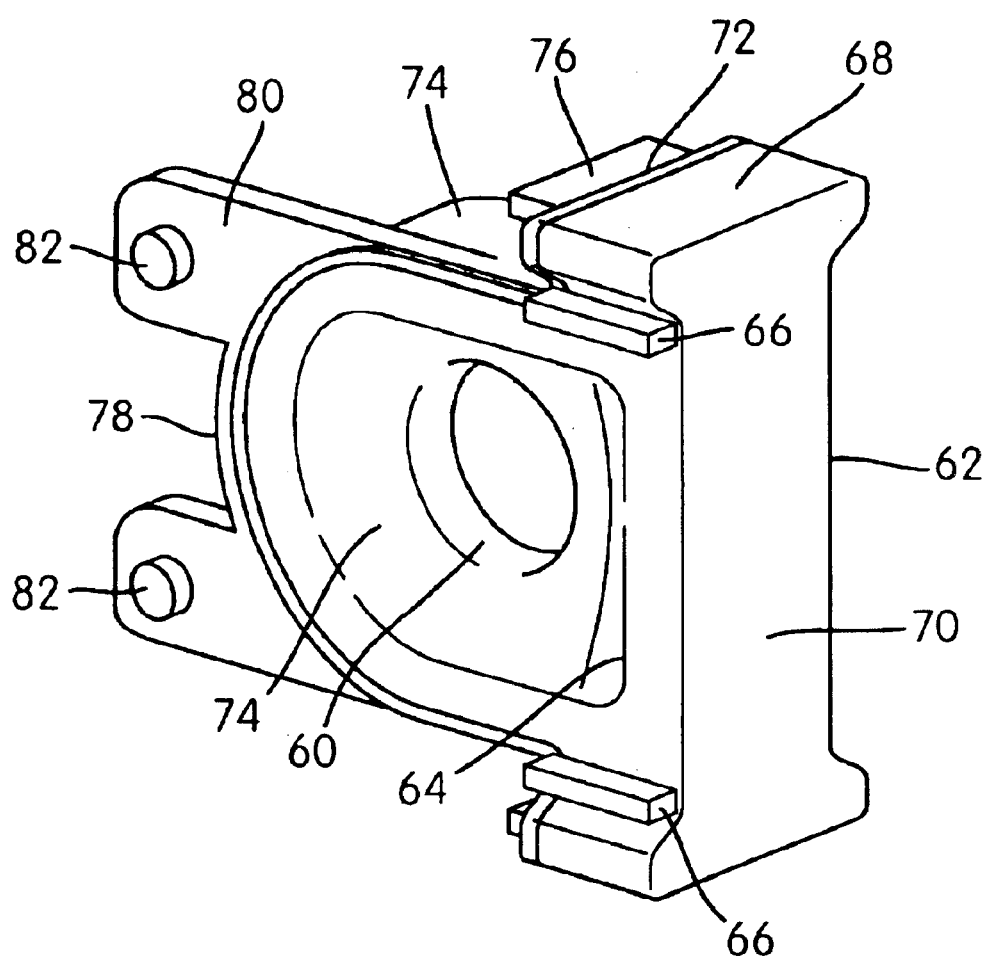
FIG. 5 is a perspective view an end member on the one end of the level of FIG. 1 shown looking down on the one end thereof and an opposite side thereof.
Figure 12:
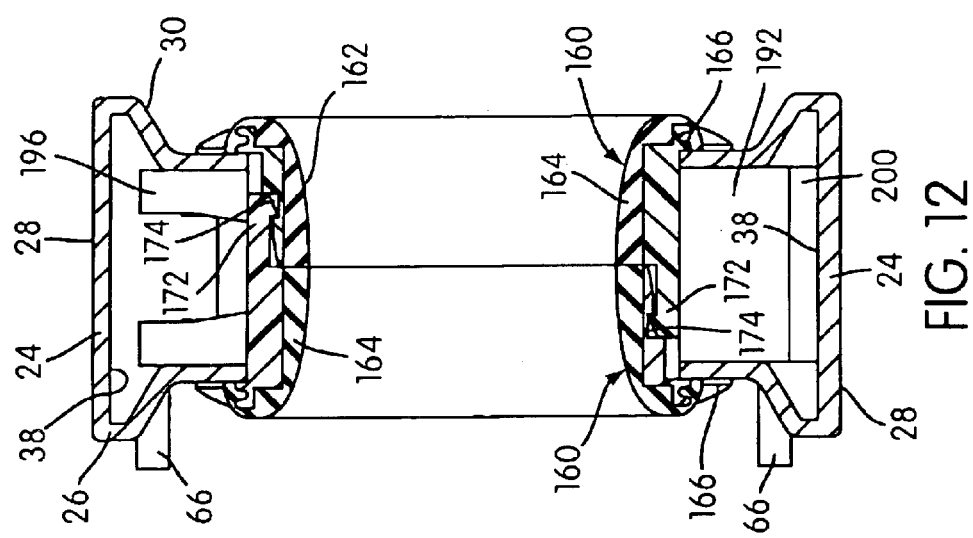
FIG. 12 is a cross section showing the hand hold assembly of FIG. 1 taken along the line 12—12 in FIG. 3.

As best shown in FIGS. 2 and 12, the thin wall frame structure 12 includes a pair of elongated operative walls 24. Each operative wall 24 has a pair of transversely spaced inwardly turned flanges 26 defining the width thereof and an exterior operative surface 28 on each of the operative walls 24 extending between the flanges 26 thereof. The operative surfaces 28 are preferably planar and parallel, but may take other configurations to provide enhanced resistance to twisting loads about the longitudinal axis of the thin wall frame structure 12.

A pair of angular walls 30 extend from each pair of spaced flanges 26 in converging relation with one another to provide structural continuity for the thin wall frame structure 12.

A pair of central walls 32 are spaced apart in the direction of the width of the operative walls 24 a distance less than the width of the operative walls 24 and integrally interconnected between the pairs of angular walls 30 extending from the flanges 26. The ends of the thin wall frame structure 12 include aligned recesses 34 in the central walls 32 thereof.

The thin wall frame structure 12 is preferably made from aluminum as for example, 6005 T5 aluminum. It is contemplated that the thin wall frame structure 12 could be made from any suitable material for securing the pair of end members 14, the horizontal level indicating assembly 16, the pairs of vertical indicating assemblies 18, the hand hold assembly 20 and the pairs of magnet assemblies 22 therein.

Each of the operative walls 24 further include outwardly facing end edges 36 between the associated operative surfaces 28 and cooperating interior frame surfaces 38 defining the wall thickness thereof.

One of the operative walls 24 has an interior marginal area defining a central opening 40 therein. The opening 40 has an elongated rectangular shape with a width less than the spacing between the central walls 32. The other operative wall 24 (without the central opening 40 therein) has a longitudinally extending series of openings 42 therein having a width equal to the width of the operative wall 24 which extends through the associated flanges 26 and into the associated angular wall 30 defining stop edges 44 therein.

The pair of central walls 32 further include a plurality of adjacent coextensive generally aligned openings 46, 48, 50 therethrough. The openings 46 are in spaced adjacent relation to the central opening 40 and both are configured to receive the horizontal level indicating assembly 16. Notches 52 in the periphery of the openings 46 position the horizontal level indicating assembly 16 therein. There are a pair of aligned openings 48 each of which are configured to receive one of the vertical level assemblies 18 and have a slot 54 to position the associated vertical level indicating assembly 18 therein. The openings 50 are longitudinally elongated and have a plurality of recesses 56 in the periphery thereof configured to receive the hand hold assembly 20. In addition to the insert receiving openings 40, 42, 46, 48 and 50, one of the central walls 32 has a pair of projection receiving openings 58 therein adjacent each recess 34. The edges 36 and the projection receiving openings 58 at each end of the thin wall frame structure 12 cooperate with the associated end member 14 to retain it in a position wherein a hand hold opening 60 extending transversely through the end member 14 is communicated with the aligned recesses 34.

The remaining portions of the operative wall 24 coextensive with the central opening 40 and the associated coextensive portions of the adjacent flanges 26 and angular walls 28 provide structural continuity for the thin wall frame structure 12 in the area of the openings 46, 48, and 50.

Each end member 14 is formed in an inner core of relatively hard material, which interfaces with the thin wall frame structure 12 and an outer layer of elastomeric material, which defines the hand hold opening 60. The relatively hard material is commercially available from the Taiwan Polypropylene Company and sold under the name Profax 7533. The elastomeric material is a thermoplastic elastomer having a durometer ranging from 70–80 as for example, J Flex 3210-63A.

As best shown in FIGS. 2, and 5–7, each end member 14 includes an end portion 62 extending outwardly of the adjacent end edge 36 of the thin wall frame structure 12. Each end portion 62 has a peg receiving opening 64 extending transversely therethrough in outwardly spaced relation with respect to the associated hand hold opening 60. The exterior surface of each end portion 62 and the associated peg receiving opening 64 are also defined by the outer elastomeric layer. The elastomeric material together with the peg receiving opening 64 provide a shock absorption function for the associated end of the thin wall frame structure 12 in the event that the level 10 is dropped on an end.

A pair of wall stand off members 66 extends transversely from each end portion 62 adjacent each operative wall 24. The stand off members 66 are formed by the outer elastomeric layer. The pairs of stand off members 66 on the end members 14 may be used to engage a wall or surface in determining the level of the wall so as to protect the wall or surface from being marred by contact with the thin wall frame structure 12.

Each end portion 62 has parallel exterior oppositely facing operative end surfaces 68 forming continuations of the operative surfaces 28, extending from an exterior transverse rear surface 70 thereof to an inwardly extending end edge 72. The end edges 72 extend perpendicularly from the end surfaces 68 toward each other and are formed by the harder core material.

A projecting portion 74 extends from each end portion 62 and is received within the aligned recesses 34 in the associated end of the central walls 32. Interior interference surfaces 76 also formed by the harder core material extend inwardly from the inwardly extending end edges 72 in slightly converging relation toward one another. The interior interference surfaces 76 of each end member 14 are disposed adjacent the interior frame surfaces 38 of the associated operative wall 24 throughout the width thereof.

A rim-like portion 78 of slightly less width extends from each projection portion 74 and is disposed between the central walls 32 adjacent the associated aligned recesses 34 therein. A pair of deflectable elements 80 extends from each rim-like portion 78. Each pair of deflectable elements 80 has a pair of transverse projections 82 thereon, received within associated pair of projection receiving openings 58 in the adjacent central wall 32.

Figure 6:
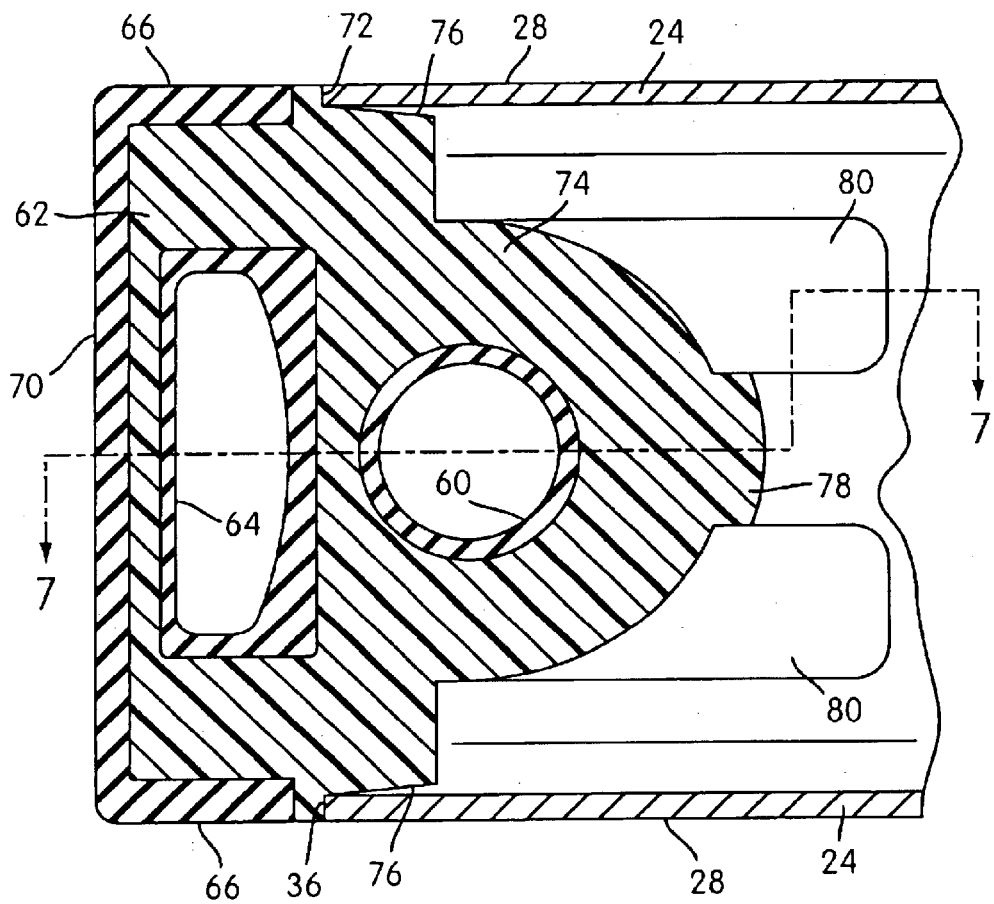
FIG. 6 is a cross section showing the end member of FIG. 1 taken along the line 6—6 in FIG. 3.
Figure 7:
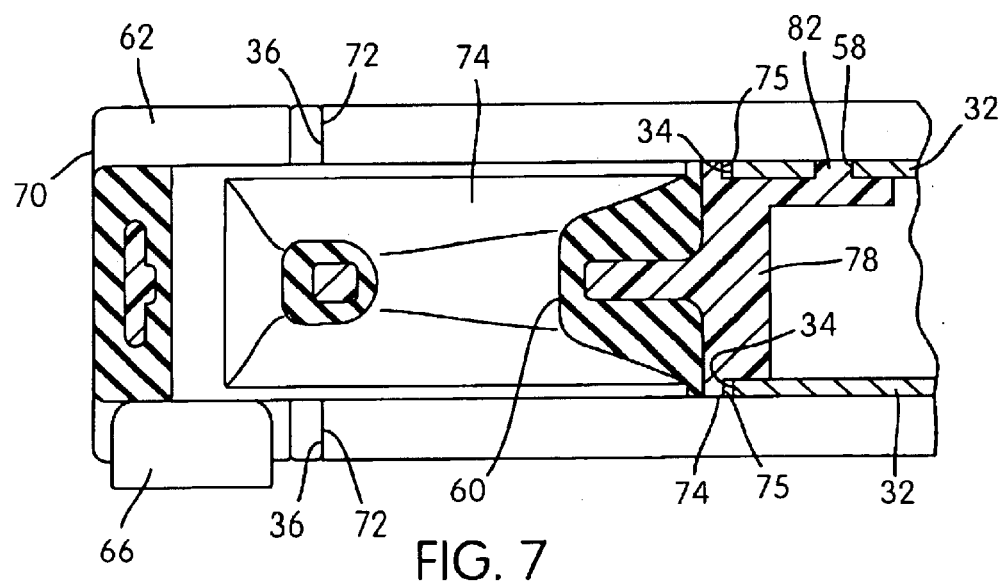
FIG. 7 is a cross section showing the end member of FIG. 1 taken along the line 7—7 in FIG. 6.

Each end member 14 is mounted in closing relation with the opening in the associated end of the thin wall frame structure 12. FIG. 6 shows the end members 14 mounted with (1) the interior interference surfaces 76 in interfering relation to the cooperating interior frame surfaces 38 and (2) the inwardly extending end edge surfaces 72 in generally abutting relation to the outwardly facing end edges 36 to thereby ensure that the operative end surfaces 68 do not extend beyond the operative surfaces 28 of the thin wall structure 12.

The distance between the interior interference surfaces 76 adjacent the end edges 72 is greater than the distance between interior frame surfaces 38 of the operative walls 24 at the associated end thereof so that the edges 36 defining the ends of the interior frame surfaces 38 will dig into one or more of the interior interference surfaces 76 when the associated end member 14 is moved into the operative position thereof. The engagement of the inwardly extending end edges 72 with the end edges 36 of the operative walls 24 ensures that the oppositely facing end surfaces 68 will not extend beyond the associated operative surfaces 28.

Each inwardly extending end edge 72 abuts the outwardly facing end edges 36 of the thin wall frame structure 12 such that the projecting portions 74 substantially fill the recesses 34 and the contiguous space therebetween. Each projecting portion 74 within the aligned recesses 34 has an edge 75 that confronts an edge of the adjacent aligned recess 34 in spaced relation. The transverse projections 82 are received by the transverse projection receiving openings 58 in the adjacent central wall 32 to ensure precise locating and retention of the end member 14 within the thin wall frame structure 12.

FIGS. 1, 2, 8 and 9 show the horizontal level indicating vial assembly 16 which includes a horizontal level indicating vial 84 and a mounting assembly 86 constructed and arranged to fixedly secure the vial 84 in an operative position.

The mounting assembly 86 includes a vial viewing and carrying member, generally indicated at 88, which constitutes a single molding having two integrally connected parts; one constituting an annular vial viewing part and the other constituting an integral U-shaped vial carrying part. The annular vial viewing part of the vial viewing and carrying member 88 includes a peripheral viewing wall portion 90 including opposite sides which extend within the central opening 40 in engagement with the side edges defining the central opening 40 so as to position the peripheral viewing wall portion 90 within the central opening 40. The ends of the peripheral viewing wall portion 90 extend inwardly toward one another. The ends and sides of the peripheral viewing wall portion 90 defining an outermost outwardly facing surface 92 and interior sloping surfaces 94 defining a viewing window for the vial 84.

Extending outwardly of the peripheral viewing wall portion 90 and inwardly of the outwardly facing surface 92 is a peripheral flange providing an outwardly facing surface 96 which is configured and positioned to engage an interior marginal surface area of the operative wall 24 surrounding the central opening 40.

The vial viewing and carrying member 88 is fixed to the thin wall frame structure 12 in an operative position between the central walls 32 wherein the outermost outwardly facing surface 96 of the peripheral viewing wall portion 90 is engaged with the interior marginal surface area of the operative wall 24 surrounding the central opening 40 and the outwardly facing surface 92 is disposed within the central opening 40 at a level inwardly of the operative surface of the associated operative wall 24.

The U-shaped vial carrying part of the vial viewing and carrying member 88 comprises a pair of apertured parallel walls 98 extending inwardly from opposite ends of the peripheral viewing wall portion 90 and a carrying wall 100 integrally interconnecting the inward ends of the parallel walls 98. The carrying wall 100 is of convexly arcuate configuration so as to receive thereon an adjustable vial supporting shim 102. The shim 102 has a convexly arcuate surface which engages the convexly arcuate surface of the carrying wall 100. The shim 102 extends between the parallel walls 98 and has a length which is slightly less than the distance between the parallel walls 98.

The vial 84 is carried on the shim between the parallel walls 98 so as to be moved with the shim 102 to enable the vial 84 to be adjusted into an accurate position with respect to the operative surfaces 28.

The vial 84 is commercially available and made of clear acrylic. The vial 84 is rounded so as to give a magnified effect when viewed through the viewing window defined by the interior sloping surfaces 94 of the mounting assembly 86. Preferably, the vial 84 is readily commercially available from Burgermeister of Austria having the product design code AH 40. It is contemplated that any type of level indicating vial may be used that is capable of providing accurate horizontal level indications.

The mounting assembly 86 further includes a pair of vial viewing and supporting members 104, which are molded of a suitable plastic material as, for example, ABS cycolac T, into identical configurations. The pair of vial viewing and supporting members 104 are mounted to the aligned openings 44 in an operative position with respect to the central walls 32 in supporting relation to the vial viewing and carrying member 88. Outwardly extending peripheral flange portions 98 extend from each vial viewing and supporting member 94 to engage an exterior marginal surface area surrounding the opening 44 in the associated central wall 32.

The aligned openings 44 are essentially D-shaped with the straight side extending adjacent the angular walls 30 of the thin wall frame structure 12. The pair of vial viewing and supporting members 104 are of similar shape and orientation. Since the pair of vial viewing and supporting members are the same in construction and operation, a description of one will suffice to provide an understanding of both.

Each vial viewing and supporting member 94 includes an outer planar D-shaped wall 106, which along its straight side engages the associated angular wall 30. The remaining U-shaped exterior periphery includes an outwardly and inwardly extending U-shaped flange 108, the free edge of which engages an exterior marginal surface area of the associated central wall 32 surrounding the associated opening 46. Sloping inwardly from the interior periphery of the outer D-shaped wall 106 is an annular window defining wall 110 which leads to the vial 84.

Extending inwardly from the interior surface of the window defining wall 110 adjacent the straight side thereof is a pair of upwardly opening hook elements 112 configured and positioned to hook under cantilevered ends of the sides of the peripheral viewing wall portion 90 of the vial viewing and carrying member 88. Extending integrally from the interior surface of the window defining wall 110 in spaced relation to the pair of hook elements 112 is a pair of notch engaging elements 114 which seat within the notch 52 in the associated opening 46. The notch engaging elements 114 extend in the direction of the parallel walls 98 and have their interior surfaces 116 facing toward one another ribbed to engage and support the parallel walls 98.

Extending integrally from the interior surface of the window defining wall 110 at the center of the U-shaped side thereof is a deflectable element 118 constructed and arranged to be deflected inwardly and snap over the associated edge of the central wall 32 defining the opening 46.

Disposed in spaced relation to the deflectable element 118 is an integral vial supporting flange 120 which extends inwardly into supporting relation to the convexly arcuate surface of the carrying wall 100.

Figure 9:
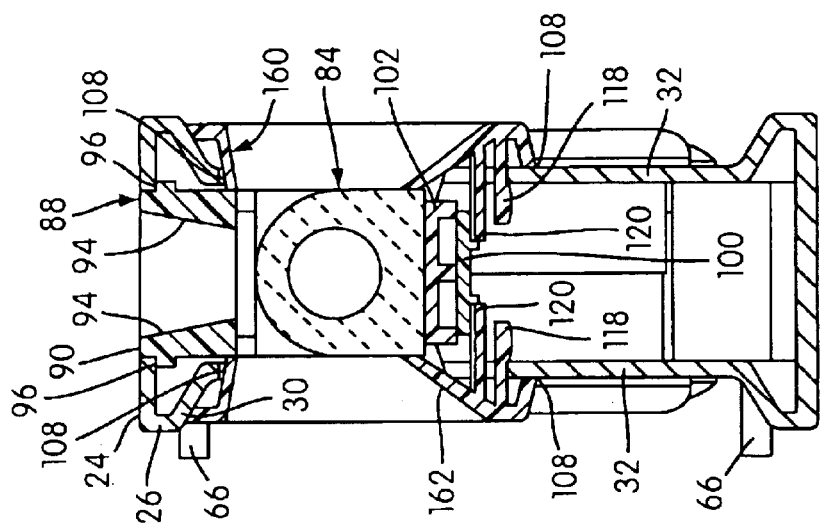
FIG. 9 is a cross section showing a horizontal leveling assembly of FIG. 1 taken along the line 9—9 in FIG. 8.
Figure 8:
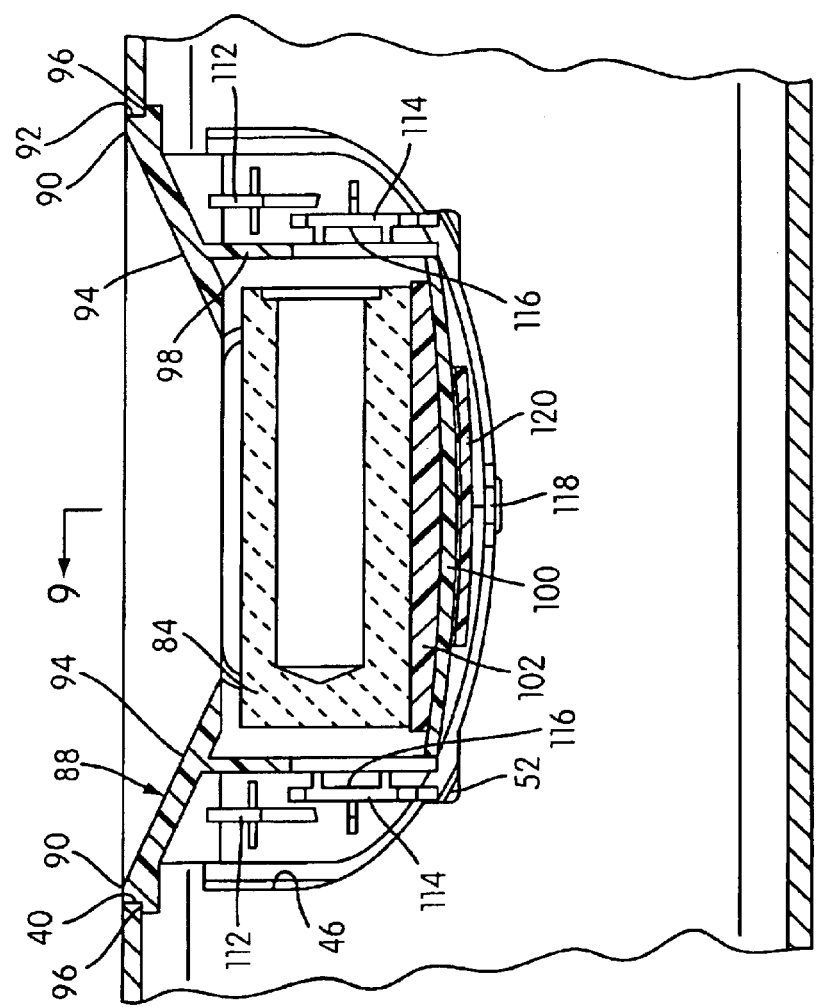
FIG. 8 is a cross section showing the horizontal leveling assembly of FIG. 1 taken along the line 8—8 in FIG. 4.

As best shown in FIGS. 1, 8 and 9, the horizontal level indicating assembly 16 is moved into its operative position thereof in the following manner. First, the vial 84 and the shim 102 are positioned within the vial viewing and carrying member 88 between the parallel walls 98, the carrying wall 100 and the vial viewing wall portion 90.

Once the vial 84 is positioned within the vial viewing and carrying member 88, the assembly is moved between the central walls 32 preferably adjacent the interior frame surface 38 of the operative wall 24 containing the central opening 40 from one end of the thin wall frame structure 12 to a position adjacent the central opening 40. However, it is possible to move the vial viewing and carrying member 88 through the elongated openings 48 and between the central walls 32 into the operative position thereof.

Once at the position adjacent the central opening 40, the assembly is moved outwardly to engage the outwardly facing surface 96 with the interior marginal surface area of the operative wall 24 surrounding the central opening 40. Next, one of the vial viewing and supporting members 104 is moved into an operative position thereof by first hooking the hook elements 112 in position on the cantilevered ends of the sides of the peripheral viewing wall portion 90 and then swinging the vial viewing and supporting member 104 about the hooked engagement until the notch engaging elements 114 engage with the notches 45 to position the entire assembly. Finally, the deflectable element 118 snaps over the associated edge of the central wall 32 to maintain the assembly in position.

The vial 84 can then be adjusted by moving it together with the shim 102 into an accurate adjustable position. An adhesive as, for example cyanoacrylate, is applied to secure the vial 84 and shim 102 in the accurate adjustable position within the vial viewing and carrying member 88. After aligning the vial 84 in the accurate adjusted position, the other vial viewing and supporting member 104 is snapped into operative position in the same manner previously described.

Adhesive, for example epoxy resin, is applied to the vial support flange 120 and the notch engaging elements 114 to fix the vial 84 supported by the vial carrying and supporting members 104 in the operative position thereof.

Figure 10:
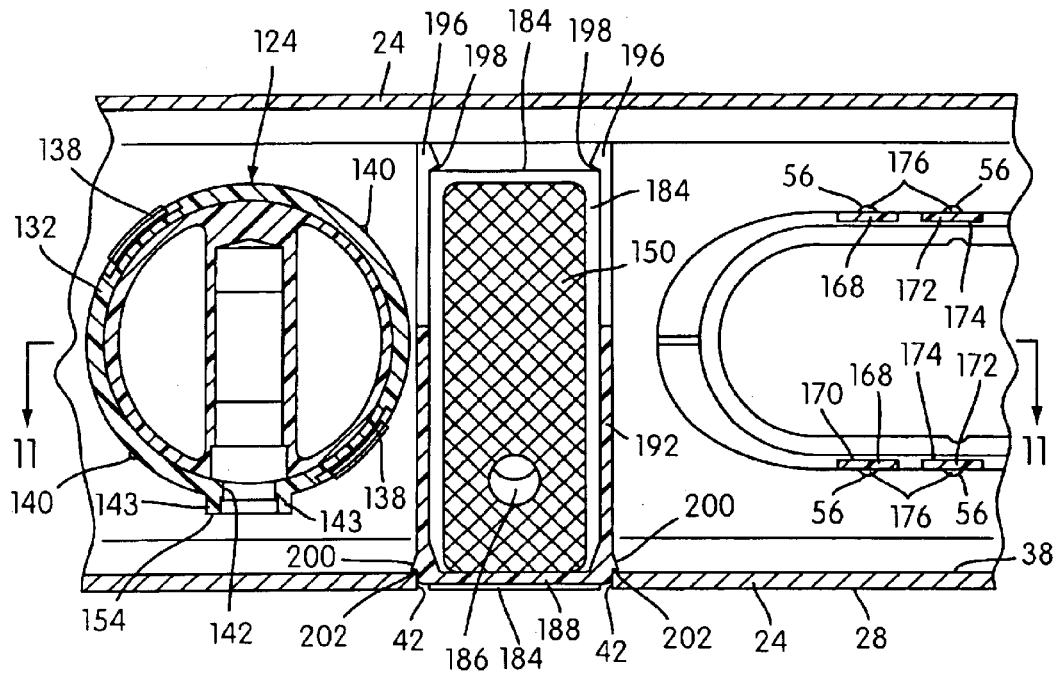
FIG. 10 is a cross section showing a vertical leveling assembly, a magnet assembly and a hand hold assembly taken along the line 10—10 in FIG. 4.
Figure 11:
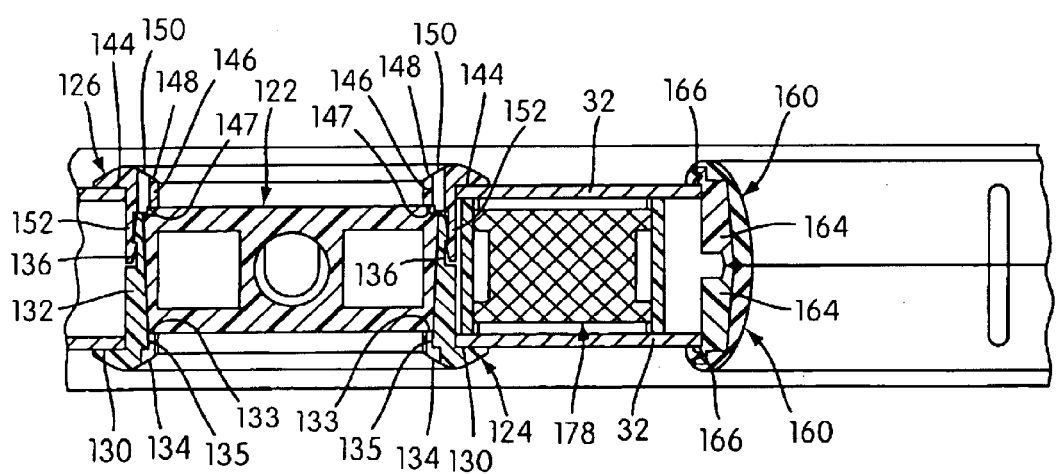
FIG. 11 is a cross section showing the vertical leveling assembly, the magnet assembly and the hand hold assembly taken along the line 11—11 in FIG. 10.
Figure 13:
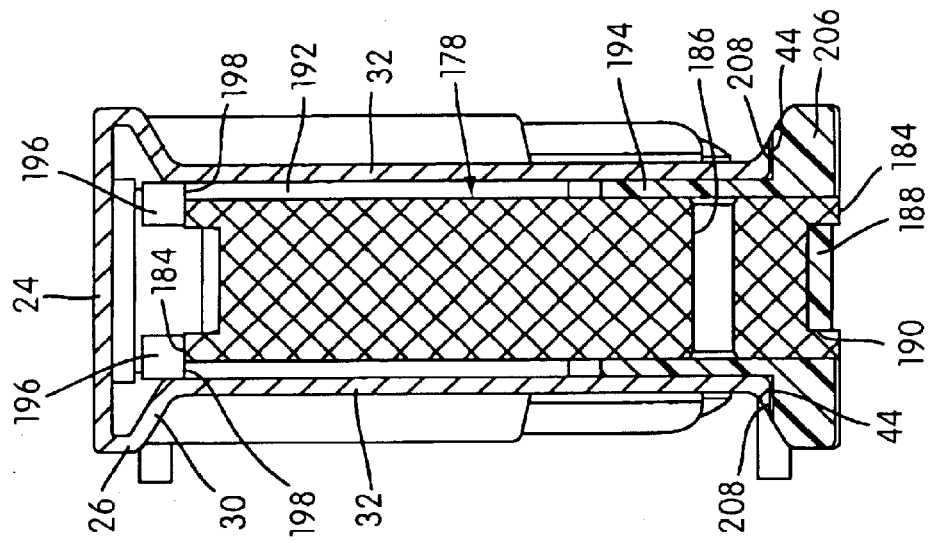
FIG. 13 is a cross section showing the magnet assembly of FIG. 1 taken along the line 13—13 in FIG. 3.

FIGS. 1, 10 and 11 show the pairs of vertical level indicating vial assemblies 18 in an operative position between the central walls 32. Since the pair of vertical level indicating vial assemblies 18 are the same in construction and operation, a description of one will suffice to provide an understanding of both. A pair of cooperating peripheral members 124, 126 retains a vertical leveling indicating vial 122 in an operative position between the central walls 32. The pair of cooperating peripheral members 124, 126 are moved axially toward one another within the aligned openings 48 in the central walls 32 into an operative position in fixed relation thereto to retain the vertical level indicating assembly 122 into an operative position between the central walls 32.

The vertical level indicating vial 122 is molded from clear acrylic into a generally tubular configuration having parallel vial viewing portions 128 therein, as best shown in FIGS. 2 and 10. The vial 122 is commercially available from Burgermeister of Austria having the product designation code of N36 Libellentype. Other types of level indicating vials may be used such as 360 vials or any other vials capable of providing accurate vertical level indications.

The peripheral member 124 includes a radially outwardly extending flange portion providing a surface 130 positioned to engage an outwardly facing exterior marginal surface area of one central wall 32 surrounding the aligned opening 48 therein.

The peripheral member 124 includes a radially inwardly extending annular wall 132, which defines an interior surface 133 for engaging and positioning one side of the vial 122 such that the vial viewing portion 128 is viewable through the peripheral member 124 and an exterior surface 134 having a pair of diametrically opposing apertures 135 therein. Disposed on the annular wall 132 of the peripheral member 124 is a pair of spaced snap action recesses 136, each of which defines a inwardly interengageable snap action surface thereon.

Extending from the annular portion 132 is a plurality of peripherally spaced radially inwardly deflectable members 138 having outwardly facing snap action surfaces 139 thereon. The plurality of peripherally spaced radially inwardly deflectable members 138 are positioned adjacent the snap action recesses 136 to engage an oppositely facing interior marginal surface area of one central wall 32 surrounding the aligned opening 48 therein. Extending from the annular portion 132 of the peripheral member 124 is a plurality of diametrically spaced raised projections 140.

The annular portion 132 has a U-shaped slot 142 therein and a pair of slot engaging projecting elements 143 extending from the bottom of the U-shaped slot 142. The pair of slot engaging projecting elements 143 are configured to cooperate with the slot 54 in the periphery of the opening 48 so as to locate the peripheral member 126 within one of the aligned openings 48.

It is within the contemplation of this invention that the U-shaped slot 142 could retain a light emitting diode (LED) therein to illuminate the vial 122 during the operation thereof.

The body of the peripheral member 126 constitutes a radially outwardly extending flange portion providing a surface 144 positioned to engage an outwardly facing exterior marginal surface area of one central wall 32 surrounding the aligned opening 48 therein.

The peripheral member 126 includes a radially inwardly extending annular wall 146, which defines an interior surface 147 facing toward the interior surface 133 of the peripheral member 124 to engage and accurately position the vertical level indicating vial 122 therebetween. The annular wall 146 also defines an exterior surface 148 facing away from the exterior surface 134 of the peripheral member 124 having a pair of diametrically opposing apertures 150 therein. Disposed on the annular wall 146 of the peripheral member 126 is a pair of spaced snap action elements 152, each of which defines a outwardly interengageable snap action surface thereon interengageable with the opposite facing interengageable snap action surface defined by the snap action recesses 136 disposed on the annular wall 132 of the peripheral member 124.

Extending from the annular wall 146 is a plurality of peripherally spaced radially inwardly deflectable members 154 having outwardly facing snap action surfaces 156 thereon. The plurality of peripherally spaced radially inwardly deflectable members 154 are positioned to engage an oppositely facing interior marginal surface area of the opposite central wall 32 surrounding the aligned opening 48 therein. Extending from the annular wall 146 of the peripheral member 126 is a pair of slot engaging elements (not shown) to position the peripheral member 126 within the opening 48. The slot engaging elements on the peripheral member 126 are positioned to abut the slot engaging elements 143 on the peripheral member 124 when the peripheral members 124, 126 are in the operative position. Extending from the annular wall 146 is a plurality of diametrically spaced raised projections (not shown), similar in structure and operation to the raised projections 140 of the peripheral member 124.

As best shown in FIGS. 10 and 11, the vertical leveling indicating vial 122 is positioned between the central walls 32 within the opening 48 encapsulated by the pair of cooperating peripheral members 124, 126 in the following manner.

The vial 122 is inserted into the peripheral member 124 such that the interior surface 133 of the annular wall 132 engages one side thereof. The vial 122 is adjusted for accuracy and tacked in place using a quick setting adhesive as for example, cyanoacrylate.

Once the vial 122 is tacked within the peripheral member 124, the peripheral member 124 is moved axially toward an operative position within the opening 48. The slot engaging elements 143 cooperate with the slot 54 in the periphery of the opening 48 to position the peripheral member 124 therein. The annular wall 132 extends through the opening 48 in one of the central walls 32 to a position adjacent the other opening 48 in the other of the central walls 32.

The surface 130 of the outwardly extending flange portion engages outwardly facing exterior marginal surface areas of one central wall 32 surrounding the aligned opening 48 therein and the raised projections 140 substantially shear off to provide a tight fit within the opening 46.

The outwardly facing snap action surfaces 139 on the peripherally spaced radially inwardly deflectable members 138 engage the interior marginal surface area of one central wall 32 surrounding the opening 48 therein.

The interengaging facing snap action recesses 136 are positioned adjacent the deflectable members 138 between the central walls 32.

The peripheral member 126 is moved axially toward the peripheral member 124 in an operative position within the opening 48. The slot engaging elements cooperate with the slot 54 in the periphery of the opening 48 to position the peripheral member 126 therein. The annular wall 146 extends through the opening 48 in the other of central walls 32 to a position adjacent annular wall 132 of the peripheral member 124.

The surface 144 of the outwardly extending flange portion engages an outwardly facing exterior marginal surface area of the other central wall 32 surrounding the other of the aligned openings 48 and the raised projections substantially shear off to provide a tight fit within the opening 46, similarly to the raised projections 140, as described above.

The outwardly facing snap action surfaces 156 on the peripherally spaced radially inwardly deflectable members 154 engage the interior marginal surface area of the other central wall 32 surrounding the other of the aligned openings 48.

The snap action elements 152 of the inwardly deflecting member 154 engages with the interengaging snap action recesses 136 on the annular portion 132 of the peripheral member 124 to fix the pair of cooperating peripheral members 124, 126 into the operative position thereof within the opening 48.

Adhesive, for example of epoxy resin, is then applied through the apertures 135, 150 on each of the peripheral members 124, 126, respectively, to cement the assembly together and to epoxy the assembly to the thin wall frame structure 12.

FIGS. 1, 2 and 11, 12 show the hand hold assembly 20 which includes longitudinally elongated cooperating peripheral members 160. The cooperating peripheral members 160 are formed of identical configuration. The cooperating peripheral members 160 are formed in a mold to include an inner core of relatively hard material as for example polypropylene, which interfaces with the thin wall frame structure 12 and an outer layer of elastomeric material, which defines a hand hold opening 162 in the position of the elongated openings 50 in the central walls 32.

The relatively hard material is commercially available from the Taiwan Polypropylene Company and sold under the name Profax 7533. The elastomeric material is a thermoplastic elastomer having a durometer ranging from 70–80 as for example, J Flex 3210-73.

The outer layer of each peripheral member 160 forms one half of the hand hold opening 162, the dual material construction of which is essentially an elongated annular wall 164 having an outwardly extending peripheral flange portion providing a surface 166 at one end thereof configured and positioned to engage an exterior marginal surface area of the central wall 32 surrounding the elongated openings 50 therein.

The inner ends of the outer layer of the annular walls 164 abut one another at the centerline. The inner core layer of each annular wall 164 has on one side a series of three projections 168 with a series of three mating recesses 170 on the other side thereof. In addition, the inner core layer of each annular wall 164 includes a projecting deflectable snap action element 172 and a mating snap action recess 174 between adjacent projections 168 on one side and between adjacent recesses 170 on the other side.

A plurality of peripherally spaced ridges 176 integrally extends from the series of three projections 168 and the series of two snap action elements 172 on each of the annular walls 164 to cooperatively engage within the plurality of recesses 56 in the periphery of the elongated openings 50.

A pair of diametrically opposing flanges 177 is disposed along the periphery of the inner core layer of each annular wall 164 in spaced relation from the series of projections 168 and the series of recesses 170.

As best shown in FIG. 12, the hand hold assembly 20 is moved into the operative position thereof in the following manner. The cooperating peripheral members 160 are axially moved into the operative position thereof to retain the peripheral members 150 in fixed relation. As the cooperating peripheral members 160 are moved axially toward the openings 50, the pair of diametrically opposing flanges 77 substantially shear against the edge of the openings 50 to provide a snug fit with the openings 50. The surface 166 of the outwardly extending flange portion engages the outwardly facing exterior marginal surface area of the central walls 32 surrounding the elongated openings 50.

The series of projections 168 are cooperatively retained within the series of mating recesses 170 such that the annular wall 164 of one peripheral member 160 abuts the annular wall 164 of the other peripheral member 160 to define the hand hold opening 162 in the position of the elongated openings 50 in the central walls 32.

Finally, the deflectable snap action elements 172 on each peripheral member 160 engage the mating snap action recesses 174 on the other peripheral member 160 in snap action relation so as to retain the cooperating peripheral members 160 into the operative position thereof within the elongated opening 50.

FIGS. 1, 2, 10, 11 and 13 show the pair of magnet assemblies 22, each of which comprises a magnet structure 178 defined by permanently magnetized material and a magnet holder 179 constructed and arranged to hold the magnet structure 178 in an operative position within the opening 42 in the operative position thereof.

Since the pair of magnet assemblies 22 are the same in construction and operation, a description of one will suffice to provide an understanding of both.

The magnet structure 178 includes a central ceramic portion 180 disposed between a pair of metal plates 182 having a pair of outwardly extending ends 184 defining the poles of the magnet structure 178. The elongated end plates 182 are secured to the central ceramic portion 180 by an adhesive such as epoxy resin, glue or any other adhesive capable of bonding the end plates 182 to the central ceramic portion 180. It may be preferable for the end plates 182 to be made from cold rolled steel. An annular bore 186 extends through the magnet structure 178 including the central ceramic portion 180 and each of the end plates 182.

The magnet holder 179 is preferably molded from ABS cycolac T to include a magnet supporting wall 188 having parallel pole aligning openings 190 for receiving the outwardly extending metal plates 182 therethrough and two pairs of opposed retaining walls 192, 194, respectively, surrounding the magnet structure 178.

The pair of retaining walls 192 has deflectable end portions 196 defining snap action surfaces 198 engageable by a snap action with opposite ends of the plate ends 184 to retain the magnet structure 178 within the retaining walls 192. A pair of snap action flanges 200 extends from each retaining wall 192 define snap action surfaces 202.

The retaining walls 194 have a recess 204 therein corresponding to the bore 186 through the magnet structure 178. Extending from each retaining wall 194 is a pair of outwardly extending bottom portions 206, each of which provides an interengageable inwardly facing surface 208.

The stop edges 44 of the openings 42 in the operative walls 24 constitute the interengageable outwardly facing surfaces of the thin wall frame structure 12 constructed and arranged to engage the interengageable inwardly facing surfaces 208.

FIGS. 1, 10, 11 and 13 show one of the magnet assemblies 22 in the operative position thereof. The magnet structure 178 is oriented such that the bore 186 therethrough aligns with the recess 204 in the magnet holder 179. The magnet structure 178 is operatively positioned within the magnet holder 179 such that the central ceramic portion 180 contacts the magnet supporting wall 188 and the two pairs of retaining walls 192, 194, respectively, surround the magnet structure 178. The ends 184 of the metal plates 182 pass through the pole aligning openings 190 and the opposite ends 184 thereof are engaged by a snap action from the snap action surfaces 198 on the deflectable end portions 196. Once the magnet structure 178 is positioned by the snap action within the magnet holder 179, adhesive such as epoxy resin is applied through the recess 204 and bore 186 to bond the magnet structure 178 in an operative position within the magnet holder 179.

The magnet holder 179 and the magnet structure 178 retained therein is operatively positioned within each opening 42 in one of the operative walls 24. The interengageable inwardly facing surfaces 208 of the bottom portions 206 interengage the outwardly facing surfaces 44 as the magnet holder 179 is moved between the central walls 32. The pair of snap action surfaces 202 engage the interior frame surface 38 to secure each magnet assembly 22 into the operative position thereof between the central walls 32 and inwardly of the operative surface 28 of the associated operative wall 24 having the openings 42 therein.

While the principles of the invention have been made clear in the illustrative embodiments set forth above, it will be apparent to those skilled in the art that various modifications may be made to the structure, arrangement, proportion, elements, materials, and components used in the practice of the invention.

It will thus be seen that the objects of this invention have been fully and effectively accomplished. It will be realized, however, that the foregoing preferred specific embodiments have been shown and described for the purpose of illustrating the functional and structural principles of this invention and are subject to change without departure from such principles. Therefore, this invention includes all modifications encompassed within the spirit and scope of the following claims.

What is claimed:

1. A level comprising:
    a wall frame structure integrally formed from an open ended section of a hollow metal structure, said wall frame structure including a pair of elongated exterior operative surfaces, each of said operative surfaces connected with a pair of transversely spaced exterior flange surfaces generally defining a width of said operative surfaces;
    a pair of exterior angular surfaces extending from each pair of spaced flange surfaces in converging relation with one another;
    a pair of exterior central surfaces each integrally connected with an associated one of the angular surfaces, said central surfaces being spaced apart in the direction of the width of said operative surfaces a distance less than the width of said operative surfaces, wherein said central surfaces are generally parallel with respect to each other;
    said pair of elongated exterior operative surfaces, said pair of exterior angular surfaces and said pair of exterior central surfaces cooperate to define an outer periphery of said wall frame structure, the outer periphery having a generally I-shaped configuration;
    wherein an internal configuration of the integrally formed wall frame structure defines a substantially open space;
    an end member closing the opening at each end of said wall frame structure, each end member having structure cooperating with the configuration of said wall frame structure so as to be fixedly secured in closing relation with respect to the associated end of said wall frame structure; and
    a level indicating vial system having structure constructed and arranged to cooperate with the configuration of said wall frame structure to fixedly secure the level indicating vial system therein;
    said wall frame structure having a hand hold assembly within longitudinally elongated aligned openings in said central surfaces, said hand hold assembly having structure constructed and arranged to cooperate with the configuration of said wall frame structure to fixedly secure the hand hold assembly within said elongated aligned openings so as to present a hand hold opening through said central surfaces,
    wherein said hand hold assembly includes an inner core of relatively hard material and an outer layer of elastomeric material.

2. A level as defined in claim 1, wherein said level indicating vial system includes a horizontal level indicating vial assembly within an opening in one of said operative surfaces, and a pair of vertical level vial assemblies within aligned openings adjacent said end members.

3. A level as defined in claim 1, wherein said operative surfaces are planar and parallel.

4. A level as defined in claim 1, wherein a length of said central surfaces between the pairs of angular surfaces is greater than a length of said angular surfaces between said flange surfaces and central surfaces.

5. A level as defined in claim 1, wherein each end member includes an inner core of relatively hard material and an outer layer of elastomeric material,
    wherein each end member includes an end portion extending outwardly of an adjacent end edge of the wall frame structure, each end portion having a pair of generally rectangular-shaped stand off members extending transversely therefrom adjacent each operative surface, the pair of stand off members having a substantially similar height from the end portion, and each end portion and stand off members thereof being formed by the outer layer of elastomeric material, and
    wherein each end portion has parallel exterior oppositely facing operative end surfaces forming continuations of the operative surfaces, the end surfaces extending from an exterior transverse rear surface thereof to an inwardly extending end edge, and the end edges extend perpendicularly from the end surfaces toward each other and are formed by the inner core of relatively hard material.

6. A level comprising:
    an integrally formed hollow body formed from a metallic material, said body having openings at the opposite ends thereof and including i) a pair of generally parallel exterior operative surfaces, ii) a pair of generally parallel central wall surfaces, said central wall surfaces being perpendicular to said operative surfaces, iii) angled surfaces extending from each end of said central wall surfaces and forming an obtuse angle with respect to said central wall surfaces, and iv) a flange surface extending between said angled surfaces and said central wall surfaces;
    wherein said integrally formed hollow body defines an interior space which is substantially open;
    an end member closing the opening at each end of said hollow body;
    a level indicating vial system carried by said hollow body;
    said parallel central wall surfaces each having longitudinally elongated aligned openings; and
    a hand hold assembly mounted at the elongated aligned openings and presenting hand hold opening surfaces extending through the aligned elongated openings in said central wall surfaces, wherein said hand hold assembly includes an inner core of a relatively hard material and an outer layer of elastomeric material.

7. A level as defined in claim 6, wherein said hand hold assembly is made from two mating halves.

8. A level as defined in claim 6, wherein each end member includes an inner core of relatively hard material extending into the respective opening at each end of the hollow body, and an elastomeric material overmolded onto a portion of the inner core disposed outside of the respective opening, said elastomeric material having protrusions extending outwardly therefrom so as to protrude beyond the flange surfaces on one side of said hollow body to provide elastomeric workpiece engaging surfaces.

* * * * *

UNITED STATES PATENT AND TRADEMARK OFFICE
CERTIFICATE OF CORRECTION

PATENT NO. : 6,792,686 B2
DATED : September 21, 2004
INVENTOR(S) : Krehel et al.

It is certified that error appears in the above-identified patent and that said Letters Patent is hereby corrected as shown below:

Column 16,
Line 39, change "said central wall" to -- said operative --.

Signed and Sealed this

Nineteenth Day of April, 2005

JON W. DUDAS
*Director of the United States Patent and Trademark Office*